United States Patent [19]

Ahner et al.

[11] Patent Number: 4,500,772
[45] Date of Patent: Feb. 19, 1985

[54] COMBINED LIQUID-COOLED ON-BOARD NETWORK GENERATOR AND HEATER FOR MOBILE VEHICLES

[75] Inventors: Peter Ahner, Ludwigsburg; Helmut Härer, Remseck; Siegfried Schustek, Immenstaad, all of Fed. Rep. of Germany

[73] Assignee: Robert Bosch GmbH, Stuttgart, Fed. Rep. of Germany

[21] Appl. No.: 424,535

[22] Filed: Sep. 27, 1982

[30] Foreign Application Priority Data

Mar. 3, 1982 [DE] Fed. Rep. of Germany ....... 3207605

[51] Int. Cl.³ .......................... H05B 1/00; H02K 9/08
[52] U.S. Cl. .................................. 219/209; 219/202; 219/205; 310/63; 310/57
[58] Field of Search ............... 219/202, 205, 208, 209, 219/10.49 R, 10.57, 10.51; 310/52, 54, 57, 58, 63

[56] References Cited

U.S. PATENT DOCUMENTS

| 1,427,416 | 8/1922 | Ray | 310/58 |
| 1,652,134 | 12/1927 | Thomson | 310/57 |
| 1,969,096 | 8/1934 | Ross | 219/209 |
| 2,414,532 | 1/1947 | Johns | 310/57 |
| 2,647,215 | 7/1953 | Egglestone | 310/72 |
| 2,702,871 | 2/1955 | Sparklin | 310/72 |
| 3,831,045 | 8/1974 | Anisimov | 310/52 |
| 3,916,231 | 10/1975 | Cathey | 219/209 |
| 3,925,695 | 12/1975 | Raby | 310/72 |
| 4,210,835 | 7/1980 | Neveux | 310/72 |
| 4,262,224 | 4/1981 | Kofink | 310/54 |
| 4,419,597 | 12/1983 | Shiga | 310/68 D |

Primary Examiner—Roy N. Envall, Jr.
Assistant Examiner—Teresa J. Walberg
Attorney, Agent, or Firm—Frishauf, Holtz, Goodman & Woodward

[57] ABSTRACT

A combined on-board electric network generator and heater for vehicles, having mounted in its housing an armature which supports at least one alternating current coil and, more particularly, three-phase current coils. The combined generator-heater has a drum-shaped rotor, driven by the engine of the vehicle. The housing of this unit is closed and encloses the rotor as well as the armature and is formed with fluid ducts. Within the housing, a cooling-air circulation is maintained which streams over the coils and rotors and cools them, transferring heat to heat exchange elements which form part of the housing. A cooling fluid circulates in the ducts in a loop through input and output ports. The loop closes upon itself outside of the housing. The cooling fluid circulation recovers heat losses in the generator and makes the heat available for heating the passenger compartment of a vehicle. Additional heat can be transferred to the fluid by an electrically heated heat exchanger with heater elements (37) which are selectively energized by switches under voltage or temperature control.

19 Claims, 14 Drawing Figures

FIG 10A

COMBINED LIQUID-COOLED ON-BOARD NETWORK GENERATOR AND HEATER FOR MOBILE VEHICLES

The present invention relates to a combined on-board electric network generator system and heater, particularly for vehicles, and more specifically to an electric generator-heater which employs a liquid or gas circulating within the generator housing for cooling of the generator-heater.

BACKGROUND

Electric generators or alternators are known which employ two claw-pole rotors, mounted on a common rotor shaft driven from the engine of a vehicle. The claw-pole rotors, each of which forms a field system, have outer surfaces which are at any given moment opposite one of two armature lamination stacks. These alternators are cooled by a cooling air stream circulating through the housing thereof. See German Patent Disclosure Document DE-OS No. 31 29 817, corresponding to our co-pending U.S. application Ser. No. 388,891, filed June 16, 1982. This type of generator requires a high-cost construction as a result of the duplicate used and is therefore expensive to produce.

THE INVENTION

It is an object of the present invention to provide a generator which operates with fluid cooling and at a lower cost.

Briefly, a generator provides for a cooling-air circulation to be maintained, streaming by and over the generator coils and the rotor. One or more parts of the generator housing are formed as a heat exchange component. Furthermore, the fluid cooling circuit forms a closed loop, closing upon itself outside of the generator housing, which is provided with an entrance and an exit port for the cooling fluid.

DRAWINGS

An illustration of the invention is given in the drawings of an on-board network electric generator and heater.

DETAILED DESCRIPTION

Figure 1:
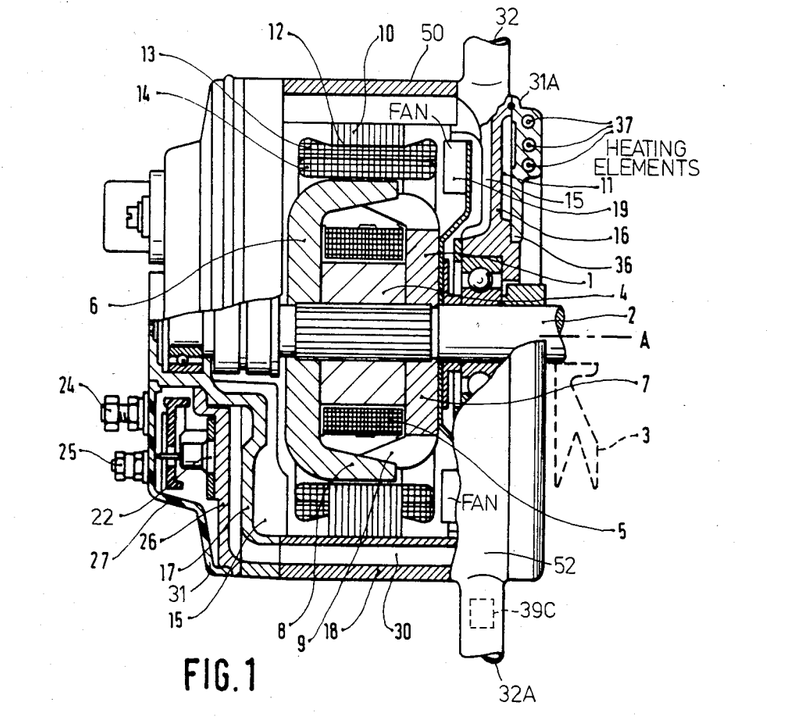
FIG. 1 is an axial side view of the generator, partially in longitudinal, cut-away section.

The generator 50 has within its housing 52 a rotating field structure 1, mounted on rotor shaft 2, and is driven by V-belt pulley 3 by the engine of an automotive-type vehicle, for example. Field 1, which rotates about the axis A of rotor shaft 2, has a central core 4 of soft iron and supports a wound excitation or field coil 5. Close to each of the two frontal surfaces of the cylindrical-shaped core 4 is one of two pole disks 6, 7. Pole disks 6, 7 have conical-shaped, finger-like projections or claws 8, 9, extending in a direction substantially parallel to the generator axis. Claws 8, 9 have alternating polarizations and rotate, succeeding one another, in circumferential direction. Accordingly, a field is established which permeates the angular-shaped armature lamination stack 10, arranged coaxially with rotor shaft 2. Two sets of armature coils 13 and 14 are set in evenly distributed slots 12 located above the cavity of the armature lamination stack 10. The armature, for some applications (see FIG. 6), can be operated with the windings separately connected; if this is not needed, coils 13, 14 can be wound as a unit, as well known, or permanently connected in parallel, or series, in accordance with a winding design. As a result of the rotation of claws 8, 9, an alternating voltage is induced, in usual and well-known manner. The armature is wound three-phase.

Heat removal out of the encapsulated interior space of the generator is accomplished by means of bearing plates 16, 17 and the mid-section 18 of the generator housing structure. Housing parts 16, 17, 18, which are formed with heavy ribbing 15, operate as heat exchangers. The circulation of the air inside of the engine housing is accomplished by a radial fan 19. The mid-section 18 of the genertor housing can be built up of a number of laminate heat exchangers 20 or 21 shown in FIGS. 2 and 3, respectively.

For a rotor of the type shown, it is possible to obtain the effect of an axial fan by closing off every second gap between the claw-poles 8, 9 of the rotor. This permits the fan 19 to be eliminated, making additional space available for enlargement of the ribs 15 on the inner surface of bearing plate 16 close to the drive side.

Figure 3:
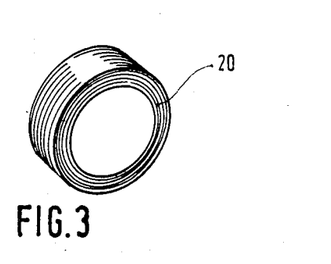
FIG. 3 shows another embodiment of a ring-cooler, for axial removal of the cooling fluid.

The heat is conducted out of the generator by a circulating cooling-medium of an externally closed fluid circuit, such as water or oil circulating in duct 30 and other similarly positioned ducts located circumferentially in the housing, for example through heat exchanger 21. Fluid is supplied and removed through ducts 32, 32a.

Power diodes 22 of a rectifier, arranged in a bridge circuit, are employed to provide a power supply for the on-board electric network of an automotive-type vehicle. The diodes are connected, on the one hand, with the three-phase coils 13 and/or 14, and, on the other hand, are connected with the positive terminal 24 and negative terminal 25, respectively, of the generator. Diodes 22, (FIG. 1) 23a (FIGS. 4–10) form a rectifier for the field coil. Since diodes 22 are subject to heavy thermal loading, the embodiment of FIG. 1 shows the diodes mounted on the bearing plate cover 26 and covered by a covering hood 27, made for example of a plastic material. In addition, cooling fluid connection 31 is located just behind plate 26.

In the embodiment of FIG. 1, a cover 36 is placed on the bearing plate 16. Cooling liquid also circulates in the gap between bearing plate 16 and cover 36. In accordance with a feature of the invention, the cooling fluid for the diodes is used as a heat transfer medium to provide heat for the vehicle. Heating elements 37 are provided in heat transfer relation to the cooling fluid. The heating elements 37 are embedded in, and insulated from one another by cover 36. Fluid can circulate in space 11 so that cover 36 functions also as a heat exchanger.

Appropriate heating elements which can be used for high heat output are for example a heating resistor 37. Heating foils or heating elements with suitable temperature vs. resistance characteristics, can be employed to obtain mid-to-low heat output.

Figure 4:
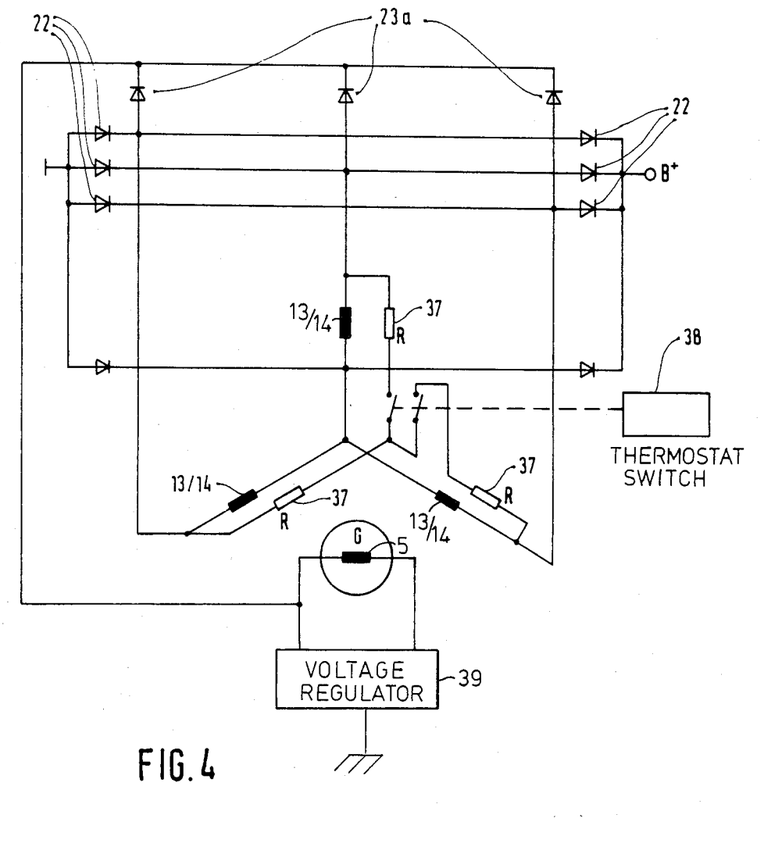
FIGS. 4 to 10 show various embodiments of circuit diagrams for the operation of the generator.

According to the embodiment of FIG. 4, heating elements 37 having a constant resistance may be connected to the alternating current or the three-phase current side of the diodes 23, through a thermostat switch 38.

Figure 5:
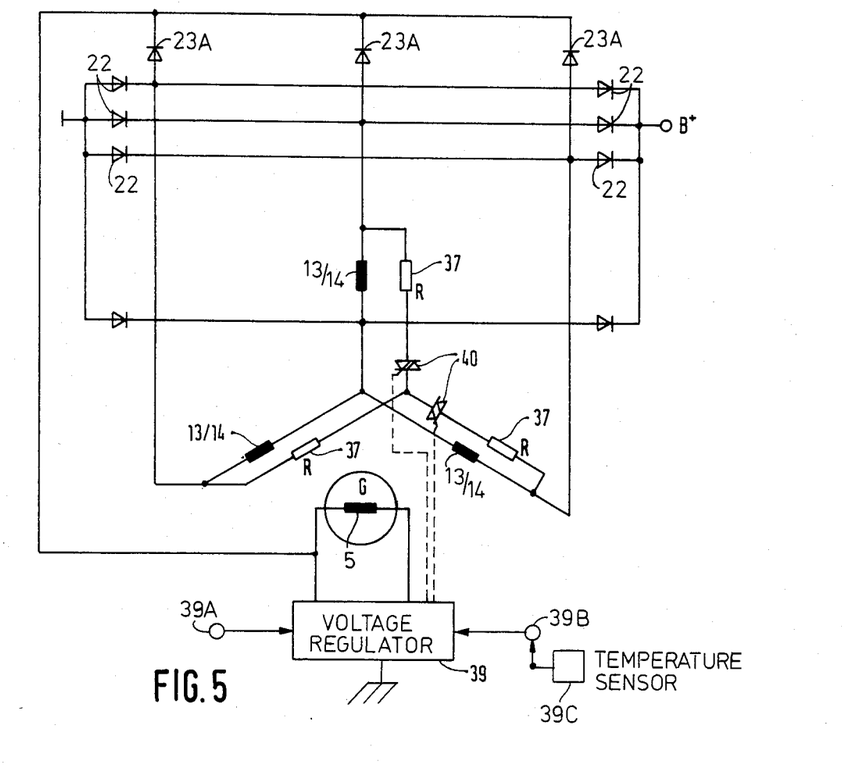

FIG. 5 shows an embodiment in which the heating elements 37 are controlled in an appropriate manner by TRIACs 40 which are controlled by voltage regulator 39. Regulator 39 has an additional temperature command input 39a and an actual temperature input 39b, derived from a temperature sensor 39c, positioned to sense actual cooling fluid temperature for example in one of the ports 32 or 32a.

Figure 5A:
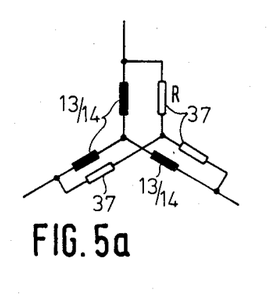
FIG. 5a is a detail of the switching configuration of FIG. 5.
Figure 5B:
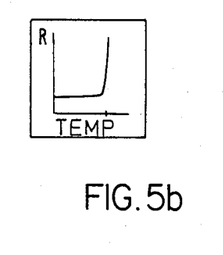
FIGS. 5b, 8a and 10a are curves of the resistance vs. temperature characteristics of the heating resistors employed.

FIG. 5a shows an embodiment which employs heating elements which have the temperature-resistance characteristics shown in FIG. 5b.

Figure 6:
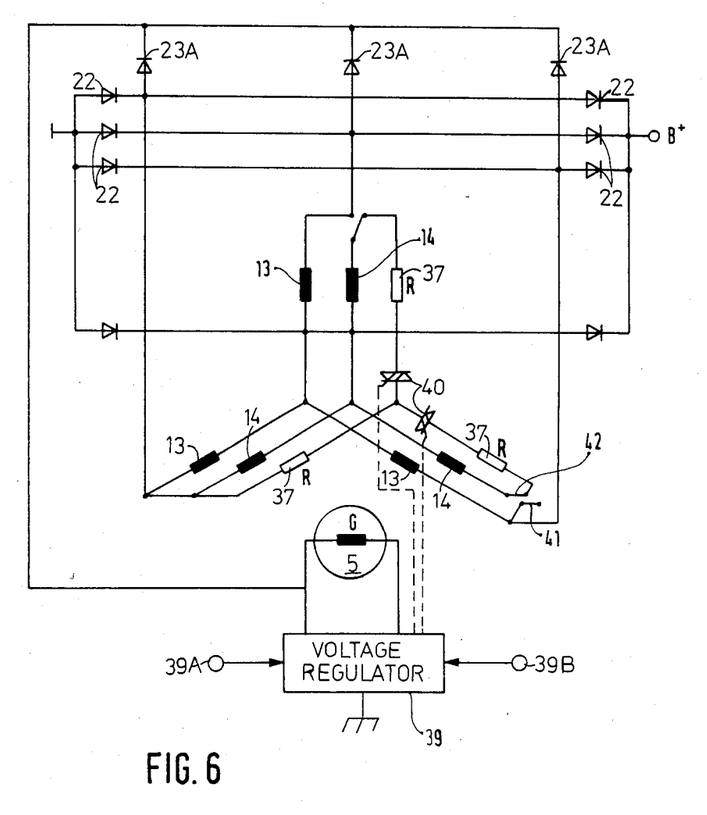

FIG. 6 shows an embodiment in which two armature coil sets or systems 13, 14 (FIG. 1) are operated selectively separately or in parallel, depending on heat requirements and in accordance with the setting of switches 41 and 42, respectively.

Figure 7:
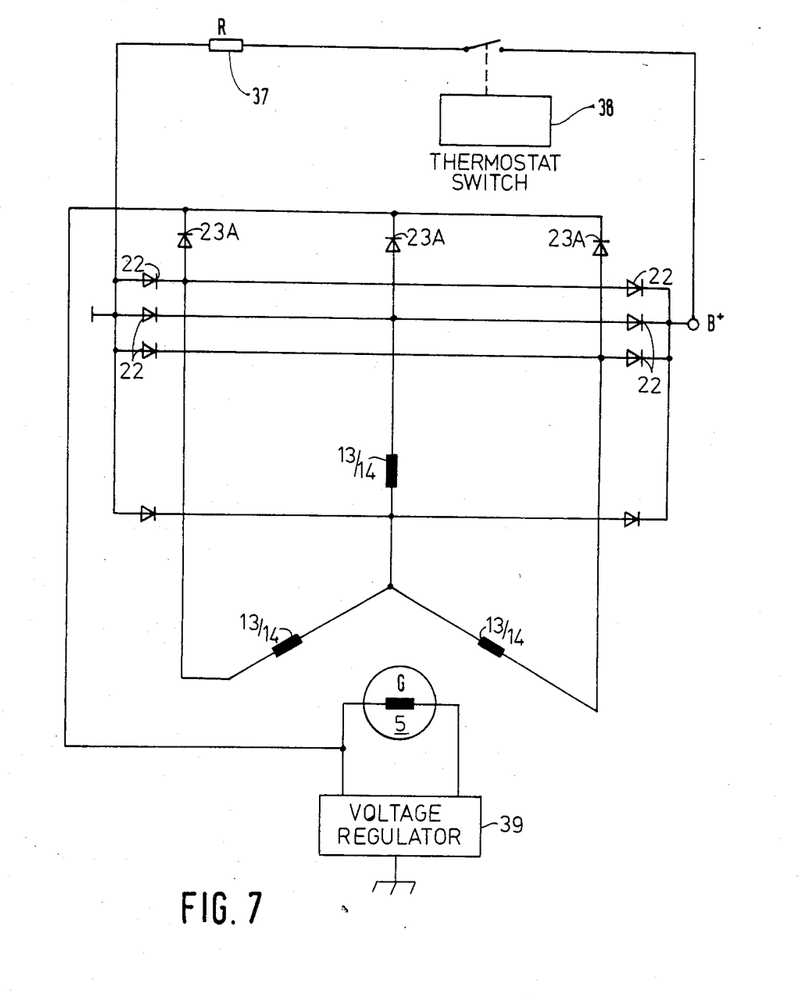

FIG. 7 shows an embodiment in which the heating elements 37 are connected to the direct current side of the alternator between the B+ terminal of the battery and ground, to a series connected thermostat switch 38.

Figure 8:
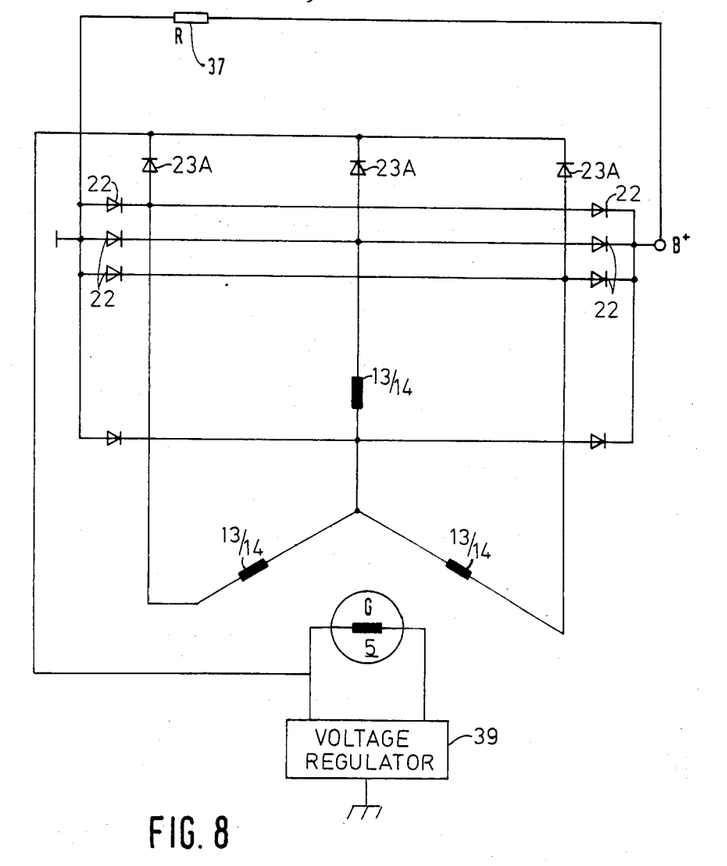
Figure 8A:
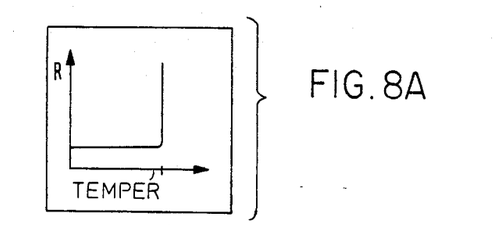

FIG. 8 shows an embodiment employing heating elements 37 having temperature-dependent resistance characteristics as shown in FIG. 8a, connected as in FIG. 8.

Figure 9:
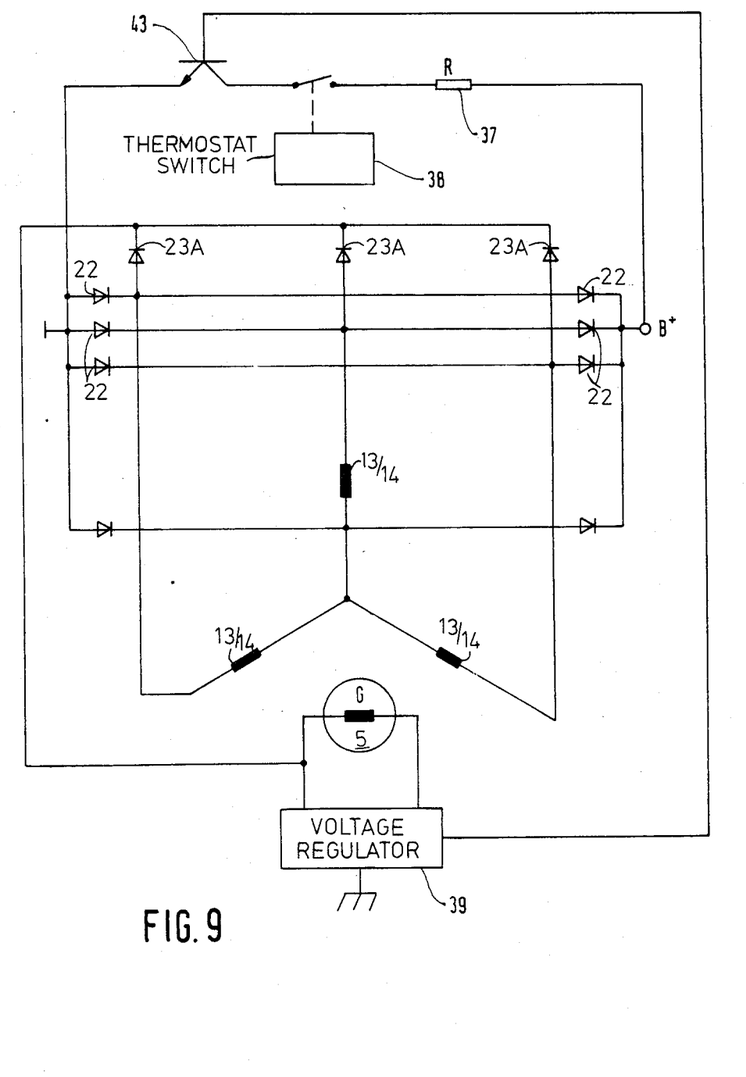

FIG. 9 shows an embodiment in which the heating elements 37, the thermostat switch 38 and a switch 43, which preferably is an electronic switch such as a transistor, are controlled by the voltage regulator 39 of the alternator. The control, effected by the voltage regulator, is set to insure that the voltage at the output terminals of the alternator remains substantially constant.

Figures 10, 10A:
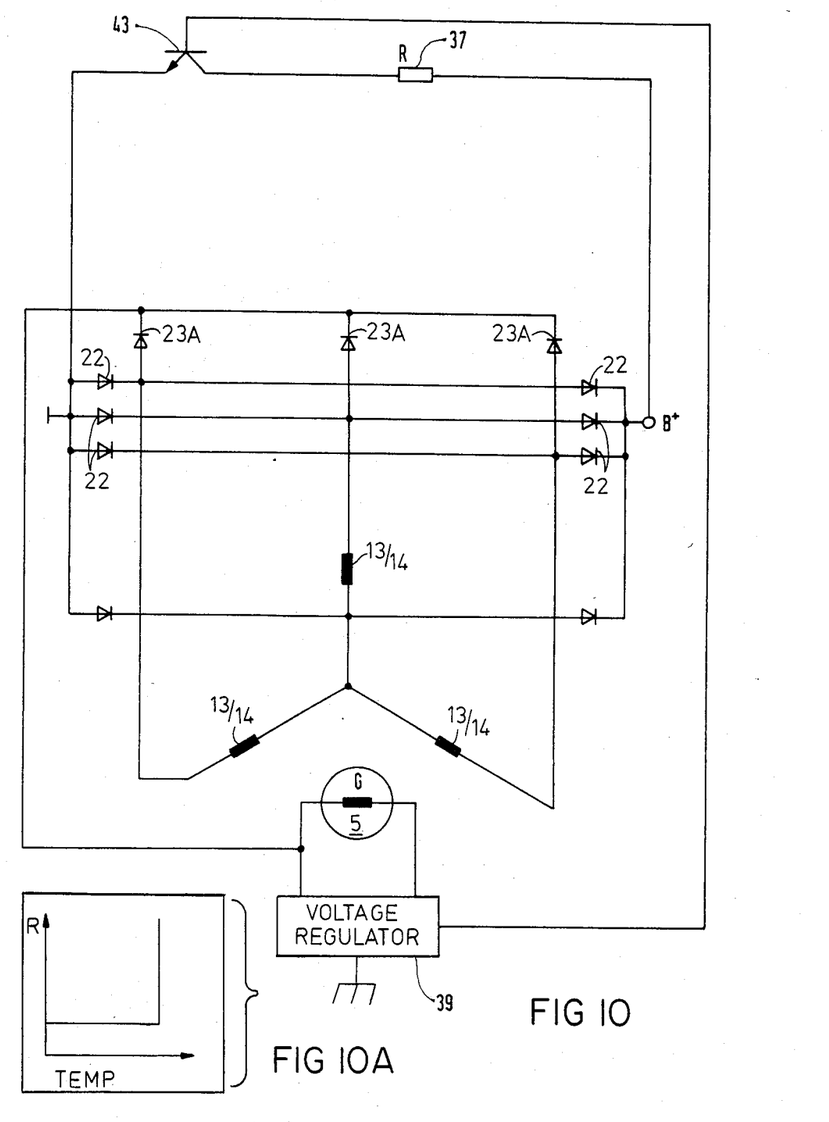

FIG. 10 shows an embodiment in which the heating elements 37 have the knee-form temperature-resistance characteristic shown in FIG. 10a, and which can be controlled in an appropriate manner by the voltage regulator 39 operating through the switches 43. The voltage regulator 39 can also be used to control switches 41, 42 of FIG. 6.

OPERATION

According to the present invention, most of the losses resulting from the operation of the electric generator, as well as a part of the electrical energy produced, can be transferred as heat to the cooling medium for heating purposes, as required. Unavoidable radiation losses, which cannot be entirely eliminated, can be significantly reduced by appropriate coating or sheathing of the alternator housing. Locating the rectifier 22 on the outer surface of the alternator housing, that is, on the cover of bearing plate 26, separates the thermally sensitive diodes 22 from the relatively warm inner space of the alternator by the cooling-liquid ducts 31. In an embodiment employing annular-shaped coolers 20, of the type shown in FIG. 3, located outside of the armature lamination stack, a considerable increase in the heat-exchanger surface area is obtained, while maintaining a constant outer diameter.

Figure 2:
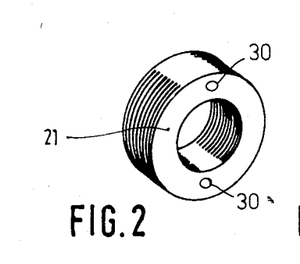
FIG. 2 shows a ring-cooler for radial removal of the cooling fluid.

An embodiment employing one or two annular-shaped coolers 21 for radial ventilation, in which the coolers are located as an axial extension next to the armature lamination stack in one or in both bearing plates, results in similarly advantageous heat-removal conditions, e.g. by use of a ring cooler 20, but with a small outer diameter.

FIG. 4 shows the basic switching diagram of a simple thermostat-controlled heater, whose constant heating resistors, having resistance R, are fed by alternating currents. The heating capacity which can be realized is determined by the combination of the power losses of the generator and by the electric power converted in the heating resistors. As the heating resistors maintain constant resistance, the heating capacity of the generator is actually dependent, in considerable measure, upon the momentary power usage of the on-board electric network, since the excitation field of the generator is switched off when the nominal value of the terminal voltage is reached. Thus, the resistance of the heating resistors is shown with due consideration of the excess power capacity of the generator, after deduction of the usual power requirement of the on-board electric network.

Similar considerations govern the realization of the embodiment given in FIG. 5a. However, as a result of the temperature-resistance characteristics of the heating element (see FIG. 5b), the thermostat switch is not required.

In the embodiment of FIG. 5, the regulator controls the TRIAC 40 of the anti-parallel thyristors, depending upon the voltage of the on-board electric network. This allows for a division of the power, between the on-board network and the relatively low-resistance heating resistors. Should the voltage at the output terminals of the generator threaten to exceed a nominal value, despite the switch-on heating resistors, the excitation field is switched off. This arrangement has the effect that the generator can be operated over a wide range of current draw-rates by the on-board electric network, with full excitation, resulting in a maximum of heating capacity when required.

FIG. 6: The high coil losses, resulting from the relatively low terminal voltage of the usual on-board electric network generators of motor vehicles, can be significantly reduced by a heat generator embodiment shown in FIG. 6. The armature coil system 13 is arranged according to the projected power usage of the on-board electric network and operates at a constant terminal voltage, for example supplying a battery at terminal B+ to supply headlights, radios, or other accessories. The second coil system 14, on the other hand, operates at an unregulated, and higher, voltage level and is connected through TRIACs 40 to the heating elements 37 which do not need rectified power. As the result of the higher voltage level, it is possible to convert the same electric power to heat with lower generator coil losses and additionally avoid heating of and losses in the rectifiers 22. The heat is thus primarily created in the heating resistors, where appropriate heat exchange is performed more easily than from the inside of the generator.

In case the full power capacity of the generator is required at the outer terminals of the generator for a short time, it is possible to switch both of the separately arranged armature coil systems 13 and 14, so that they operate in parallel, using the switches 41, 42. The heating capacity which then remains available is reduced, however.

With a switching arrangement as shown in FIG. 7, a large heater resistance is connected to the direct current side of rectifier 22 through a thermostat switch 38, i.e. to the power supply for the on-board electric network.

As in FIG. 4, the heating power performance which can be achieved is dependent in large measure upon the power used by the on-board electric network. This is the case also for the embodiment of FIG. 8, in which the resistance of the heating resistors exhibits a temperature-resistance characteristics which enables the heating resistors to switch themselves off.

In the embodiments of FIGS. 9 and 10, a division of electric power between the on-board electric network and the heating resistors of the heater is made possible by periodic closing of switch 43, with the duty cycle dependent upon the terminal voltage of the on-board electric network generator and upon the electric power drawn by the on-board network. The power division thus obtained is similar to that achieved by the embodiment of FIG. 5. In this embodiment also, the excitation voltage of the generator is reduced only when the voltage of the on-board electric network threatens to exceed its upper limiting value, despite transistor switch 43 being fully conductive.

In comparison with the known tandem embodiments of alternators described in the introduction, which involve low cost control means and which exhibit low losses in the armature coils of the usual heat-generator section but high mechanical costs, the present invention permits embodiments entailing a single simple active control system, with simpler and lower cost mechanical structure for the alternator. The embodiments of the present invention involve a certain increased cost for controls, dependent upon the requirements for controllability and for power distribution between the on-board electric network and the heater.

Various changes and modifications may be made, and features described in connection with any one of the embodiments may be used with any of the others, within the scope of the inventive concept.

We claim:

1. A combined on-board electric network and heat supply generator system for vehicles having engines and passenger compartments, comprising
   a closed housing structures (52);
   an armature (10) mounted within the housing;
   at least one alternating current coil (13,14) supported on the armature;
   a rotor shaft (2) mounted in the housing;
   a claw-pole rotor (6-9) mounted on the rotor shaft (2) and driven by the engine of the vehicle;
   means (19) for circulating a cooling medium inside the housing, said cooling medium streaming over the alternating current coils (13,14) and the rotor;
   having at least one part of the housing formed as a heat exchange element which is cooled by the cooling medium, and an externally closed heat exchange liquid circuit, including entrance and exit ports (32,32a) formed on the housing for heating the passenger compartment of the vehicle, and having a portion of the liquid circuit in heat exchange relation to the heat exchange element, and having at least one electric heating element (37) mounted in at least one of the parts of the housing (52), and a switch (38,40,41,42,43) connecting the heating element with at least one alternating current coil (13,14), the heating element (37) being positioned in heat exchange relation with the fluid circuit.

2. Generator according to claim 1, wherein the switch (38) is thermostatically controlled.

3. Generator system according to claim 1, wherein a plurality of heating elements (37) are provided and said elements (37) are mounted in a part of the housing (52) which comprises a cover (36).

4. Generator according to claim 1, wherein the heating element (37) has a sharply rising resistance characteristic as a function of temperature above a predetermined temperature value, and is connected with at least one alternating current (13, 14).

5. Generator according to claim 1, wherein the heating element (37) is mounted in at least one of the parts of the housing (52), and a switch (38, 40, 41, 42, 43) connecting the heating element with at least one alternating current coil (13, 14);
   and wherein the heating element has a sharply rising resistance characteristic as a function of temperature above a predetermined temperature value, and is connected with at least one alternating current (13, 14).

6. Generator according to claim 1, wherein (FIGS. 5, 6) the switch comprises a TRIAC (40).

7. Generator according to claim 1, having dual armature windings (13, 14);
   a rectifier network (22);
   and wherein the switch (41, 42) is arranged for selectively connecting:
   (a) the heating element to one of said armature windings, and the other one of the armature windings to the rectifier network;
   (b) said dual armature windings, in parallel, and to the rectifier network; and
   (c) said dual armature windings (13, 14) in parallel and to the rectifier network and the heating elements to the parallel connected dual armature windings.

8. Generator according to claim 1, wherein (FIG. 6) the generator is a three-phase generator, and dual armature windings are provided, star-connected, the switch having separate switching elements connected to the free terminals of the dual phase windings;
   and wherein three heating elements are provided, commonly connected at one terminal to form a common star terminal and, at their free end, to said switch (41, 42).

9. Generator according to claim 1, wherein said generator is a three-phase generator;
   said armature comprises dual armature windings (13, 14);
   three resistance heating elements (37) are provided;
   switch means (38, 40, 41, 42, 43) selectively connecting at least one of said resistance heating elements to at least one of said armature windings (13, 14),
   and a rectifier structure (22), the rectifier structure being connected to one (13) of said armature windings to provide direct current output to the electric network.

10. Generator according to claim 1, wherein (FIGS. 4-10) a voltage regulator (39) is provided, and the switch (40) selectively connecting and disconnecting the heating element is connected to and controlled by said voltage regulator.

11. Generator according to claim 10, further including (FIG. 5) a temperature sensor (39c) connected to the voltage regulator to affect the voltage regulating function thereof, said voltage regulator selectively controlling the switch (40) as a function of sensed temperature by the temperature sensor (39c) to control the response of the switching function by said voltage regulator with respect to the switch (40) as a function of sensed temperature.

12. Generator according to claim 1, wherein the heating elements have a resistance versus temperature characteristic which is sharply rising as a function of temperature above a predetermined temperature value.

13. Generator according to claim 1, wherein (FIG. 6) the switch includes two triacs (40) connected in series with two of the three heating elements;

and wherein a voltage regulator (39) is provided having a control output connected to and controlling operation of said triacs (40).

14. Generator according to claim 1, wherein at least one heating element (37) is connected between the positive and the negative terminals of the generator.

15. Generator according to claim 14, wherein the heating resistors have a sharply rising resistance characteristic as a function of temperature above a predetermined temperature value.

16. Generator according to claim 14, wherein the switch is a temperature-sensitive switch;

and the at least one heating element (37) is connected in series with the temperature-sensitive switch (38).

17. Generator according to claim 14, wherein the heating elements (37) are connected in series with a switching path of an electronic controllable switch.

18. Generator according to claim 17, wherein the electronic switch comprises a transistor (43).

19. Generator according to claim 17, further including a voltage regulator (39) connected to the output of the generator;

and wherein the control electrode of the switch (43) is connected to the regulator (39).

* * * * *